United States Patent [19]

Gilbert et al.

[11] 3,952,161

[45] Apr. 20, 1976

[54] AUDIO PROCESSOR CIRCUIT FOR AN FM-STEREO RADIO RECEIVER

[75] Inventors: William F. Gilbert; Burtron D. Schertz, both of Kokomo; Wayne A. Smith, Russiaville; Lester Wilkinson, Kokomo, all of Ind.

[73] Assignee: General Motors Corporation, Detroit, Mich.

[22] Filed: Oct. 21, 1974

[21] Appl. No.: 516,797

[52] U.S. Cl. .............................. 179/15 BT; 179/1 G
[51] Int. Cl.² ......................................... H04R 5/04
[58] Field of Search ............. 179/1 G, 1 GA, 1 GQ, 179/15 BT

[56] References Cited
UNITED STATES PATENTS 3,281,533   10/1966   Pflager et al. ...................... 179/1 G
3,673,342   6/1972   Muller ............................. 179/15 BT

*Primary Examiner*—Kathleen H. Claffy
*Assistant Examiner*—George G. Stellar
*Attorney, Agent, or Firm*—Albert F. Duke

[57] ABSTRACT

An audio processor is disclosed which includes circuitry for modifying pure left and right audio signals by blending the left audio signal with the right audio signal as a function of frequency and for rolling off the higher frequencies of the blended signal. The processor further includes circuitry for selecting complementary portions of a blended, rolled-off audio signal and a pure audio signal as a function of the RF carrier strength to improve the overall listenability of the audio.

6 Claims, 4 Drawing Figures

AUDIO PROCESSOR CIRCUIT FOR AN FM-STEREO RADIO RECEIVER

This invention relates to FM stereo receivers and more particularly to an FM stereo receiver including an audio processor for improving the signal-to-noise ratio of stereo audio signals.

FM stereo receivers are designed so as to receive FM mono or stereo and include means for decoding the transmitted composite stereo signal into left and right audio signals. Most receivers also include means for automatically switching into the stereo decode mode when a stereo signal is being received.

At low carrier strength, stereo reception becomes poor in quality because of increasing noise levels from high frequency system noise, decoding noise, and a higher stereo noise caused by wider bandwidths involved in stereo transmissions. At minimum carrier strength, the switch from the mono mode to the stereo mode is accompanied by a 23dB increase in noise which significantly degrades the signal-to-noise ratio of the received audio signals in the left and right channels. As the carrier strength increases from the minimal stereo reception level, the signal-to-noise ratio becomes more acceptable. Accordingly, many FM receivers include means for automatically sensing the strength of the carrier signal and switch to the stereo mode only when the carrier strength is sufficient to allow stereophonic reproduction with an acceptable signal-to-noise ratio.

Another problem in stereophonic reproduction is related to the total audio power delivered to the speakers. The transmitted stereo composite (L + R and L − R) is decoded to produce a signal of 2R in the right channel and 2L in the left channel. If the RMS voltage levels of the left and right channels are approximately the same, the power delivered to the speakers for each channel will be approximately the same whether the receiver is operating in the mono mode or stereo mode. Since the intent of stereo reproduction is to produce a different signal in each channel, RMS voltage level produced in each audio channel is usually unequal and, therefore, the power delivered to the speaker on one channel is usually not the same level as the power delivered to the speaker of the other channel. Under these conditions a switch from the stereo mode to the mono mode or vice versa is accompanied by a change in the total audio power which is objectionable to the listener. For example, in a worst case condition, assume a signal of 2L in the left channel and no signal in the right channel in the stereo mode. If the mode is changed to mono, the resultant is L in the left channel and L in the right channel. The RMS voltage level of the left channel has thus dropped to ½ (6dB) of the original RMS voltage and the right channel audio signal equals the left channel audio signal. Since the power levels vary with the square of the voltage, ¼ of the original power level is delivered to each speaker so that the total audio power delivered to the speakers is reduced by one-half.

Several proposals have been made toward alleviating the problem of poor signal-to-noise ratio at low carrier strength when operating in the stereo mode. As previously mentioned, many stereo receivers increase the threshold of the decode circuitry to allow stereo decoding only at high carrier strength levels where the signal-to-noise ratio would be acceptable. This approach, however, reduces receiver performance by reducing the range of distance from the FM transmitter where stereo reception is possible. Also, the effect of switching from the mono mode to the stereo mode and vice versa when the receiver is being operated in an area where the carrier strength is varying above and below the switching threshold is objectionable. It has also been proposed to avoid the objectionable switching effect by allowing a gradual transition from mono to stereo by connecting a variable resistor across the decoder outputs and varying the resistance and thus the channel separation as a function of RF carrier level. Neither of these approaches alleviate the problems attributed to changes in audio power levels caused by changes from mono to stereo.

A blend of the two stereo audio channels has also been proposed in certain FM receivers which permit insertions of a capacitor across the two audio channels. The blend capacitor reduces stereo noise and maintains separation at lower audio frequencies, however, the capacitor must be manually inserted by means of a switch.

FM stereo receivers installed in automobiles produce reception problems which are unique as compared with receivers which are located in a fixed position. Since the receiver is mobile, it can be moved from a location of high carrier strength to a location of low carrier strength and multipath conditions can cause widely varying character strengths over short distances. Accordingly, the aforementioned problems of stereo reception are more prevalent in automobile stereo receivers. In some automobile FM receivers the tone response in the listening range of the human ear are tailored to attenuate higher frequencies relative to lower frequencies. Therefore, most of the audio power delivered to the speakers is concentrated in the lower frequency audio spectrum. In the copending application Ser. No. 383,243, filed July 27, 1973, assigned to the assignee of the present invention, a field effect transistor is biased to operate as a variable resistor which connects a capacitor across the two stereo channels. The capacitor functions to blend the higher audio frequencies and, therefore, much of the stereo noise, to a mono condition. The capacitor maintains some separation at lower audio frequencies, therefore, maintaining the basic audio power levels being delivered to the speakers. The transistor in series with the capacitor acts as a variable RC time constant connected across the stereo channels. While this approach alleviates the audio power level problem and reduces stereo noise, the transistor switches from an open circuit condition to a short circuit condition over a small change of RF carrier strength. The quick transition from the stereo to the blended mode results in a noticeable change in noise levels.

In accordance with the present invention the left and right stereo channels are interconnected by a capacitor so that the higher audio frequencies are blended to mono to eliminate much of the noise. Since much of the total audio power in an automobile receiver is concentrated in the lower frequencies of the listening range of the human ear, separation between the two channels at lower frequencies is maintained. Thus, a reduction in noise is obtained without a significant reduction in audio power. In order to achieve a gradual blend to the mono condition as the RF carrier strength decreases the processor of the present invention develops two signal paths for each channel. One of the paths allows the pure input signal to pass unchanged to a current steering multiplier circuit. The second signal path blends the input signal across a capacitor to the opposite channel, rolls off the higher frequencies and passes this signal to the same multiplier circuit. The multiplier circuit in each channel is controlled from a voltage translator circuit so that a complementary portion of each of the two signals are selected and summed together as a function of RF carrier strength to give an output which can range between the normal signal and the fully blended, rolled-off signal. The voltage translator circuit responds to a DC control voltage which varies proportionally to RF carrier level present in the I.F. stage of the receiver and includes another current steering multiplier and associated circuitry which allows adjustment of the gain of the translator to match the rate of change of the DC control voltage and also allows adjustment to match the level of the DC control voltage. The translator circuitry allows the transition from a normal audio signal to the blended rolled-off signal over a wide range of RF signal strength such as, for example, 15dB.

A more complete understanding of the present invention may be obtained from the following detailed description taken in conjunction with the drawings in which.

Figure 1:
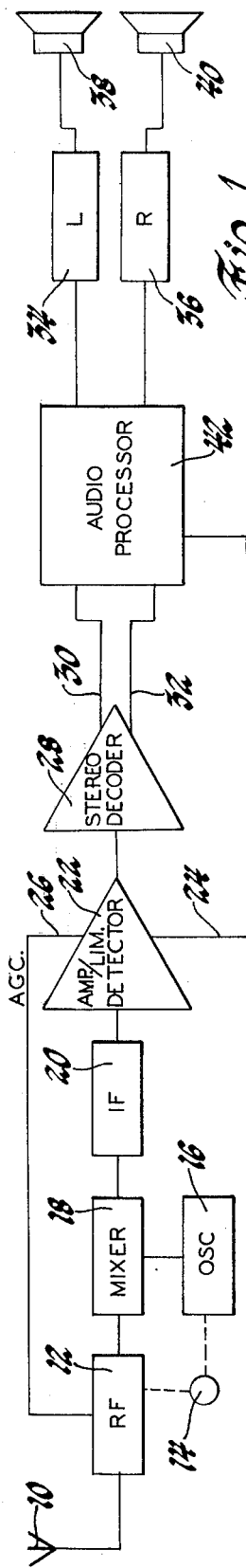
FIG. 1 is a block diagram of an FM stereo receiver incorporating the audio processor of the present invention.

Referring now to the drawings and initially to FIG. 1, an FM stereo receiver includes an antenna 10 for collecting broadcast signals from the surrounding medium, usually the atmosphere. A radio frequency (RF) amplifier stage 12 has a relatively broad gain versus frequency response centered about a reception frequency which is tunable via a manually operable tuning knob 14. The RF amplifier stage 12 is responsive to the output of the antenna 10 for amplifying a selected broadcast signal having a carrier frequency coinciding with the reception frequency. A local oscillator stage 16 produces an oscillator signal at an output frequency which is also tunable via the manually operable tuning valve 14 such that the output frequency of the oscillator stage 16 always differs from the reception frequency of the RF amplifier stage 12 by a constant fixed intermediate frequency which lies within the radio frequency spectrum and the audio frequency spectrum. A mixer stage 18 is responsive to the output of the RF amplifier stage 12 and the output of the oscillator stage 16 for heterodyning the selected broadcast signal with the oscillator signal to decrease the carrier frequency of the selected broadcast signal to precisely the fixed intermediate frequency.

An intermediate frequency (IF) amplifier stage 20 has a relatively narrow gain versus frequency response centered about the fixed intermediate frequency. The IF amplifier stage 20 is responsive to the output of the mixer stage 18 for amplifying the selected broadcast signal. An integrated circuit generally designated 22 includes an amplifier-limiter section and a quadrature-detector section that provides such auxiliary functions as delayed RF-AGC and tuning meter output. A suitable integrated circuit is the RCA-CA3089E disclosed in Linear Integrated Circuit Application Note ICAN-6257 available on request from RCA Solid State Division, Box 3200, Summerville, N.J. The application note is incorporated herein by reference. The circuit 22 further includes three peak detectors which are connected to successive ones of a three stage amplifier-limiter. The output on line 24 is the sum of the outputs of the three peak detectors and is a logarithmic DC output as a function of input signal. The circuit developing the delayed AGC on line 26 is driven by the level detector connected to the first IF stage in the circuit 22. The AGC voltage is fed back to the RF amplifier 12 to control the gain of the stage 12 as is well known to those skilled in the art.

The signal output of the circuit 22 is applied to a stereo decoder 28 which decodes the composite signal to recover the left (L) audio signal on line 30 and the right (R) audio signal on line 32. Normally, the left and right audio signals developed at the outputs of the decoder 28 on the lines 30 and 32 respectively are applied to left and right audio amplifier stages 34 and 36 respectively where the signals are amplified and applied to left and right speakers 38 and 40, respectively. In accordance with the present invention the signals appearing on the lines 30 and 32 are processed by an audio processor generally designated 42 interposed between the decoder 28 and the amplifiers 34 and 36. The processor 42 also receives the DC output of the circuit 22 on the line 24 for controlling the left and right outputs of the processor in accordance with RF carrier signal strength.

Figure 2:
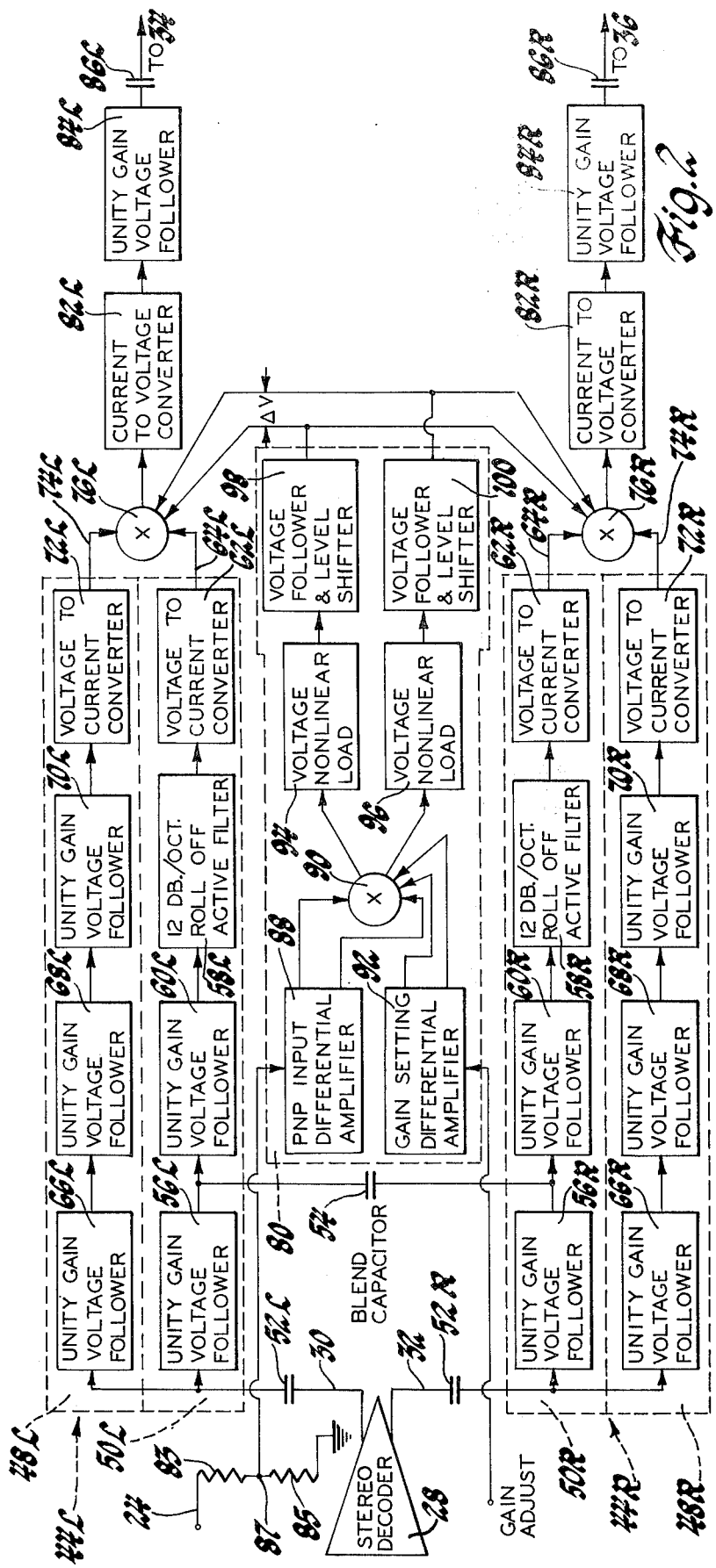
FIG. 2 is a more detailed block diagram of the audio processor shown in FIG. 1.

Referring now to FIG. 2, the audio processor 42 includes left and right signal processing channels generally designated 44L and 44R respectively. Each channel 44L and 44R include subchannels 48 and 50 which in turn include identical components appropriately designated by the subscripts L and R. The left audio signal from the decoder 28 is coupled to subchannel 48L and 50L of the left signal processor 44L through a coupling capacitor 52L. Similarly, the right audio signal from the decoder 28 is coupled to subchannels 48R and 50R of the right signal processing channel 44R through a coupling capacitor 52R. The subchannels 50L and 50R are interconnected by a capacitor 54. The capacitor 54 crosscouples the AC signal appearing at the output of voltage followers 56L and 56R which isolate the capacitor from the subchannels 48L and 48R respectively. At low frequencies the capacitor 54 looks like an open circuit and little of the signal in the subchannels 50L and 50R is crosscoupled. The signal in the subchannels 50L and 50R are fed through an active filter 58L and 58R respectively, which are isolated from the capacitor 54 by unity gain voltage followers 60L and 60R, respectively. The filters 58L and 58R attenuate the voltage appearing in the output of the voltage followers 60L and 60R at a rate of 12dB per octave above a breakpoint frequency of about 3,000 Hz. The blended and rolled-off signals appearing in the subchannels 50L and 50R are applied to voltage-to-current converters 62L and 62R respectively to produce a frequency dependent blended and rolled-off signal at the outputs of 64L and 64R of subchannels 50L and 50R respectively.

The subchannels 48L and 48R include unity gain voltage followers 66L, 68L, 70L and 66R, 68R, and 70R respectively, and voltage-to-current converter 72L and 72R respectively. The voltage followers 66L, 68L, and 70L match the voltage drops associated with the voltage followers 56L, 60L and the active filter 58L so that the DC bias in the subchannel 48L at the output 74L is the same as the DC bias in the subchannel 50L at the output 64L. The voltage followers 66R, 68R, and 70R perform a similar function in the subchannel 48R. The outputs of the subchannels 64L and 74L provide inputs to a current steering multiplier 76L which combines complementary portions of the output signals of the subchannels 48L and 50L under the control of a voltage translator generally designated 80. The translator 80 provides a control voltage to the multiplier 76L which is proportional to the RF carrier signal strength as obtained from the circuit 22. With a strong RF signal 100% of the output of the subchannel 48L appears at the output of the multiplier 76L. With a weak RF signal, 100% of the blended, rolled-off signal appearing at the output of the subchannel 50L is provided at the output of the multiplier 76L. When the RF carrier is between some minimum and maximum strength, complementary portions of the outputs of the subchannels 48L and 50L are selected. The selected portions of the two input signals to the multiplier 76L are summed to a current of 100% (DC) and converted to a voltage by a converted 82L and passed through a unity gain voltage follower 84L and coupled to the left audio amplifier 34 through a capacitor 86L.

The voltage translator 80 permits adaption of the processor to receivers which vary in receiver background noise and to variation in the gain of the circuits 22 in different receivers. The voltage of the output 24 of the circuit 22 is applied across voltage dividing resistors 83 and 85. The junction 87 between the resistors is applied to a PNP differential amplifier 88 in the voltage translator 80. The amplifier 88 compares the input DC voltage to an internal reference voltage and develops differential currents in proportion to the differential voltage. The differential currents are fed to a current multiplier 90 which is utilized to adjust the difference in currents from the amplifier 88 to thereby control the gain of the amplifier 88. The multiplier 90 is controlled from gain setting differential amplifier 92. The differential output currents of the multiplier 90 are converted to a non-linear voltage in the blocks 94 and 96 which is applied to followers 98 and 100 which perform an isolation and DC voltage level shifting function. The differential voltage $\Delta V$ is applied to the multipliers 76L and 76R to select complementary portions of the currents at 64L, 74L and 64R, 74R. More specifically, the multiplier 76L combines a portion K of the current at 74L with a complementary portion $l-k$ of the current at 64L under the control of the voltage $\Delta V$. The multiplier 76R responds to the voltage $\Delta V$ to select complementary portions of the currents at 64R and 74R. With a strong RF signal, K=1 and 100% of the signal in subchannels 48L and 48R are selected. With a weak RF signal K=0 and 100% of the blended, rolled-off signal in the subchannels 50L and 50R are selected. For marginal RF signals, K is between 0 and 1 depending on signal strength.

Figure 3A:
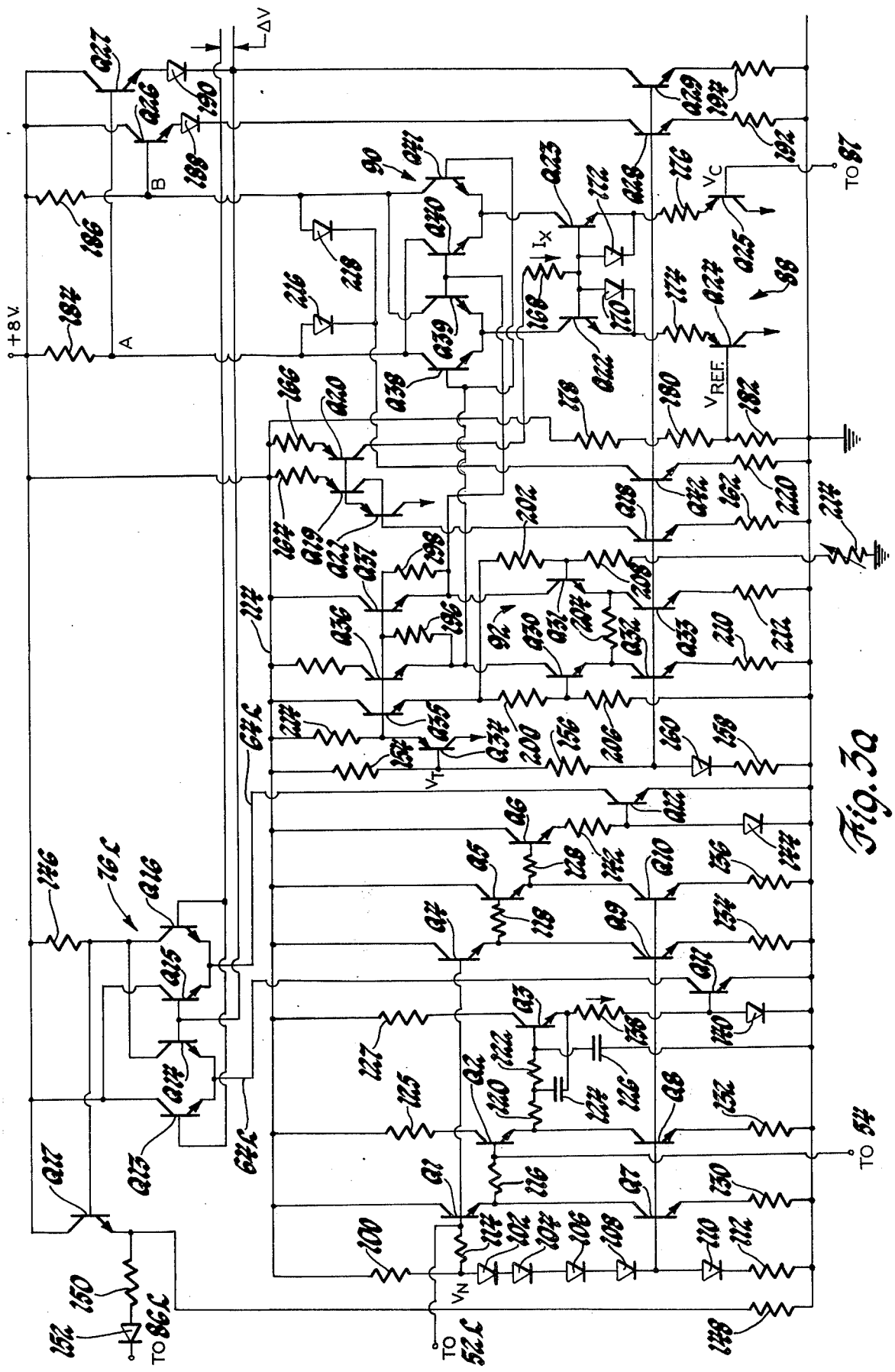
FIG. 3a and FIG. 3b are a detailed schematic diagram of the audio processor of the present invention.

Referring now to FIG. 3a, the subchannel 50L comprises emitter-follower transistors Q1, Q2 and Q3 and the subchannel 48L comprises emitter-follower transistors Q4, Q5, and Q6. A DC bias and temperature compensation network includes a resistor 100, diodes 102, 104, 106, 108, 110 and resistor 112 and is connected between an 8V bus 114 and ground and establishes a direct current of approximately 500 microamps. The base of transistors Q1 and Q4 are connected through a biasing resistor 114 to a junction $V_n$. The emitters of Q1 and Q4 are connected to the base of transistors Q2 and Q5 through base biasing resistors 116 and 118 respectively. The emitter of Q2 is connected to the base of Q3 through resistors 120 and 122 which along with capacitors 124 and 126 and the transistor Q3 form the active filter 58L (FIG. 2). The collectors of Q2 and Q3 are connected to the bus 114 through resistors 125 and 127 respectively. The emitter of Q5 is connected to the base of Q6 through a base biasing resistor 128. The emitters of transistors Q1 and Q2 are connected to ground through transistor Q7, resistor 130, and transistor Q8, resistor 132 respectively. Similarly, the emitters of transistors Q4 and Q5 are connected to ground through transistor Q9, resistor 134, and transistor Q10, resistor 136 respectively. The transistors Q7, Q8, Q9, and Q10 are connected to the junction between diodes 108 and 110. The transistors Q7, Q8, Q9, and Q10 are matched with the diode 110 while the resistors 130, 132, 134, and 136 are matched with the resistor 112 so that the current in the collector of transistors Q7, Q8, Q9, and Q10 is the same as the current flowing through the diodes 102–108. Thus, the DC emitter current in Q1, Q2, Q4, and Q5 will be approximately the same as the current flowing in the diode stack 102–108. The transistors Q1–Q3 are matched with the transistors Q4–Q6 so that the DC voltage at the base of Q3 is the same as the DC voltage at the base of Q6. The emitters of Q3 and Q6 are respectively connected to ground through resistor 138, diode 140, and resistor 142, diode 144. The resistors 138 and 142 are matched as are the diodes 140 and 144 so that the DC current flowing through resistors 138 and 142 is the same. The current in the resistors 138 and 142 is reflected in the collector circuit of transistors Q11 and Q12 which are connected with the current steering multiplier 76L. The AC voltage signal for the left audio channel is applied to the bases of transistors Q1 and Q4. Since there are four base-emitter diode drops in each of the subchannels, i.e. Q1, Q2, Q3, diode 140 of subchannel 50L and Q4, Q5, Q6, diode 144 in subchannel 48L, the resistors 100 and 112 are proportioned in a ratio of five to one so that one-fifth of the voltage drift associated with the diodes 102–110 as a result of temperature variation, appears across the resistor 100 and four-fifths of the diode stack drift appears at $V_n$. The resistors 100, 112, 138, and 142 are diffused resistors and their temperature drift will be the same. The effects of the base bias resistors are negligible since only base current flows through these resistors. Therefore, $V_n$ varies as four diodes and the resulting voltage drop across resistors 138 and 142 will remain constant with temperature since $V_n$ will vary to compensate for the variations of Q1, Q2, Q3, diode 140 and Q4, Q5, Q6, diode 144, while resistors 110 and 112 will vary the same as resistors 138 and 142.

With the circuit properly biased and compensated the AC voltage signal applied to the base of Q4 appears at the emitter of Q6 and is converted to a current in the resistor 142 and reflected in the collector of transistor Q12. The AC voltage signal from the left audio channel also is applied to the base of Q1 and appears at the base of Q2. The base of Q2 is the connection point for the blend capacitor 54 which cross-couples the AC signal between the two subchannels 50L and 50R. At low frequencies the capacitor 54 looks like an open circuit and little of the signal in the subchannels 50L and 50R is fed across the capacitor 54 to the opposite channel. At high frequencies, however, capacitor 54 appears as a short circuit and the base of Q2 is shorted to the base of the corresponding transistor in the opposite channel 50R so that the same signal appears on both bases. The signal at the base of Q2 appears at the emitter of Q3 but attenuated at a rate of 12dB per octave beyond a break frequency determined by the value of the resistors 120, 122 and capacitors 124 and 126.

The current steering multiplier 76L comprises transistors Q13, Q14, Q15 and Q16. The bases of transistors Q14 and Q15 are tied together as are the bases of Q13 and Q16 and respond to a differential voltage $\Delta V$ from the voltage translator 80. When the RF carrier level is high, control voltage at the bases of transistors Q13–Q16 is such that the Q13 and Q16 are On and Q14 and Q15 are Off. In this condition all of the signal current in the subchannel 48L flows through Q16 and appears as a voltage across a load resistor 146. Transistor Q17 and resistor 148 form an emitter follower stage so that the signal voltage at the base of Q17 appears at the emitter of Q17 and is applied through the resistor 150, diode 152, and coupling capacitor 86L, to the audio amplifier 34. As the RF carrier level decreases, Q14 and Q15 begin to turn on and Q13 and Q16 begin to turn off. The transistors Q13, Q14, Q15 and Q16 are matched so that the amount of signal current in the collectors of Q14 and Q15 are the same and the amount of signal current in the collectors of Q13 and Q16 are the same. Accordingly, the DC current through resistor 146 remains the same regardless of the relative conduction of the transistors Q13–Q16 so that no Q point shift results with changes in the control voltage from the translator 80. The amount of signal current in the resistor 146 from the respective subchannels 48L and 50L is, however, dependent on the relative conduction of the transistors Q14 and Q16. For instance, when the RF carrier level is in the middle of the range where it is desirable for blending to occur, the voltage at the bases of the transistors Q13–Q16 will be nearly the same. In this condition, approximately one-half of the blended signal current in the subchannel 50L and one-half of the normal signal current in the subchannel 48L would flow through the resistor 146 and appear as a signal voltage at the base of Q17. The resulting output voltage is then a partially blended signal.

The voltage translator 80 comprises a bias network including resistors 154, 156, and 158 and diode 160 connected between the 8V bus 114 and ground which establishes a current of 500 microamps and a voltage at the junction $V_T$ of approximately 4.4 volts. A current source including a transistor Q18 and a resistor 162 are matched with the diode 160 and the resistor 158 respectively so that 500 microamps also flows in the collector of Q18. The current in the collector of Q18 is reflected by a current mirror comprising PNP transistors Q19, Q20, resistors 164, 166, and substrate PNP transistor Q21 so that 500 microamps also flows in the collector of Q20 and through the resistor 168. The current in the resistor 168 is split between the diodes 170 and 172 and reflected in the collectors of matching transistors Q22 and Q23 respectively under the control of the differential amplifier 88 which responds to a DC control voltage at the junction 87 proportional to the strength of the received RF carrier signal. The differential amplifier 88 comprises substrate PNP transistors Q24 and Q25 and resistors 174 and 176. Resistors 178, 180 and 182 establish a reference voltage at the base of the transistor Q24. The base of the transistor Q25 is connected to the junction 87 between the voltage dividing resistors 83 and 85 which are connected between the output 24 and ground. The currents in the collectors of Q22 and Q23 are cross-coupled by a current steering multiplier 90 under the control of a gain setting differential amplifier 92 as will be described more fully hereinafter, so that a total of 500 microamps flows through the resistors 184 and 186. The differential voltage appearing across the resistors 184 and 186 is applied to the current steering multipliers 76L and 76R through emitter follower transistors Q26 and Q27 which isolate the resistors 184 and 186 to prevent any loading by the multipliers 76L or 76R. Diodes 188 and 190 perform a voltage level shifting function. Transistor Q28, resistor 192, and transistor Q29, resistor 194 supply a constant current to transistors Q26 and Q27.

The differential amplifier 92 comprises transistors Q30, Q31, Q32, and Q33 and resistors 196–212. The resistors 196 and 198 are tied to the emitter of a substrate PNP transistor Q34, having an emitter resistor 214 connected with the 8 volt bus 114. The emitter of Q34 follows the base of Q34 which is tied to the reference voltage at the junction $V_T$. The resistors 200 and 202 are tied to the emitter of transistor Q35 which follows the voltage at the emitter of Q34. The transistors Q36 and Q37 clamp the voltage across the resistors 196 and 198 to prevent the voltage from dropping below that of the base of Q34 and also non-linearize the voltage and thus linearize the current in the base-emitter junctions of Q38, Q39 and Q40, Q41 of the current steering multiplier 90. The resistors 200 and 206 establish a reference voltage at the base of Q30. The resistor 204 couples the emitters of transistors Q30 and Q31 to current sink Q32, resistor 210, Q33, and resistor 212 to set the differential gain of the amplifier 92. The resistors 202 and 208 and the variable resistor 214 establish the desired voltage at the base of Q31. The value of the resistor 214 reduces the gain between the differential voltage applied to the amplifier 88 and the differential voltage applied to the multiplier 76L and 76R.

The current steering multiplier 90 comprises transistors Q38–Q41. The bases of Q38 and Q41 are connected with the collector of Q30 while the bases of Q39 and Q40 are connected with the collector of Q31. The emitters of transistors Q38 and Q39 are connected with the collector of transistor Q22 while the emitters of transistors Q40, Q41 are connected with the collector of transistor Q23. The collectors of transistors Q38 and Q40 are cross-coupled and connected with the resistor 184 while the collectors of transistors Q39 and Q41 are cross-coupled and connected with the resistor 186. Diodes 216 and 218 are connected to a current sink comprising transistor Q42 and resistor 220 and load the resistors 184 and 186 to non-linearize the voltage $\Delta V$ in response to a linear changing control voltage at the differential amplifier 88. Thus, the linear changing control voltage applied to the differential amplifier 88 produces a non-linear changing $\Delta V$ which in turn produces a linear change in the current in the multipliers 76L and 76R.

The operation of the audio processor circuit shown in FIG. 3a may be briefly summarized as follows. When the RF carrier level is strong, the DC control voltage $V_c$ at the base of the transistor Q25 is high relative to the internal reference voltage $V_{REF}$ at the base of transistor Q24. In this condition Q24 is turned on and Q25 is turned off. None of the source current $I_r$ can flow in diode 172 since Q25 is off and, therefore, Q23 has no collector current and no current flows in resistor 186. Q24 being on causes all of the source current $I_r$ to flow through diode 170 and the collector current of Q22 is 500 microamps which flows through resistor 184. Therefore, point A is lower in voltage than point B and the transistors Q13 and Q16 of the multiplier 76L are on and the transistors 14 and 15 of the multiplier 76L are off and the normal stereo signal current is fed to the load 146. As the RF carrier strength weakens the $V_c$ decreases. As $V_c$ decreases in level, Q25 begins to conduct some current and Q24 begins to conduct less current. When this happens the voltage at point A increases and the voltage at point B decreases resulting in a lower differential voltage between points A and B so that Q14 and Q15 conduct some current and Q13 and Q16 conduct less current. In this condition some blended rolled-off signal current is steered to the output resistor 146 and most of the normal signal current reaches the output. If the RF carrier strength decreases to the point where $V_c$ equals $V_{REF}$, the current $I_x$ splits equally between diodes 170 and 172. This results in equal collector currents in Q22 and Q23 and the voltage drop across resistors 184 and 186 are equal. Therefore, the differential voltage $\Delta V$ is a 0 and the bases of Q13–Q16 would all be at the same voltage. In this condition, one-half of the blended rolled-off signal current would be steered to the output resistor 146 and one-half of the normal stereo signal current would be steered to the output resistor 146. This may be termed the 50% blend condition. As the RF carrier level continues to drop $V_c$ drops below the internal reference $V_{REF}$ and Q25 begins to conduct more current than Q24. The source current $I_x$ then flows mostly through diode 172. In this condition very little collector current flows in Q22 and the collector current from Q23 approaches the level of $I_x$. The small collector current in Q22 results in a voltage at point A being higher than the voltage at point B and consequently, most of the blended rolled-off current being fed to the output resistor 146. When the RF carrier level becomes very weak, Q25 conducts all of $I_x$ and all of the blended rolled-off signal current is fed to the resistor 146.

Figure 3B:
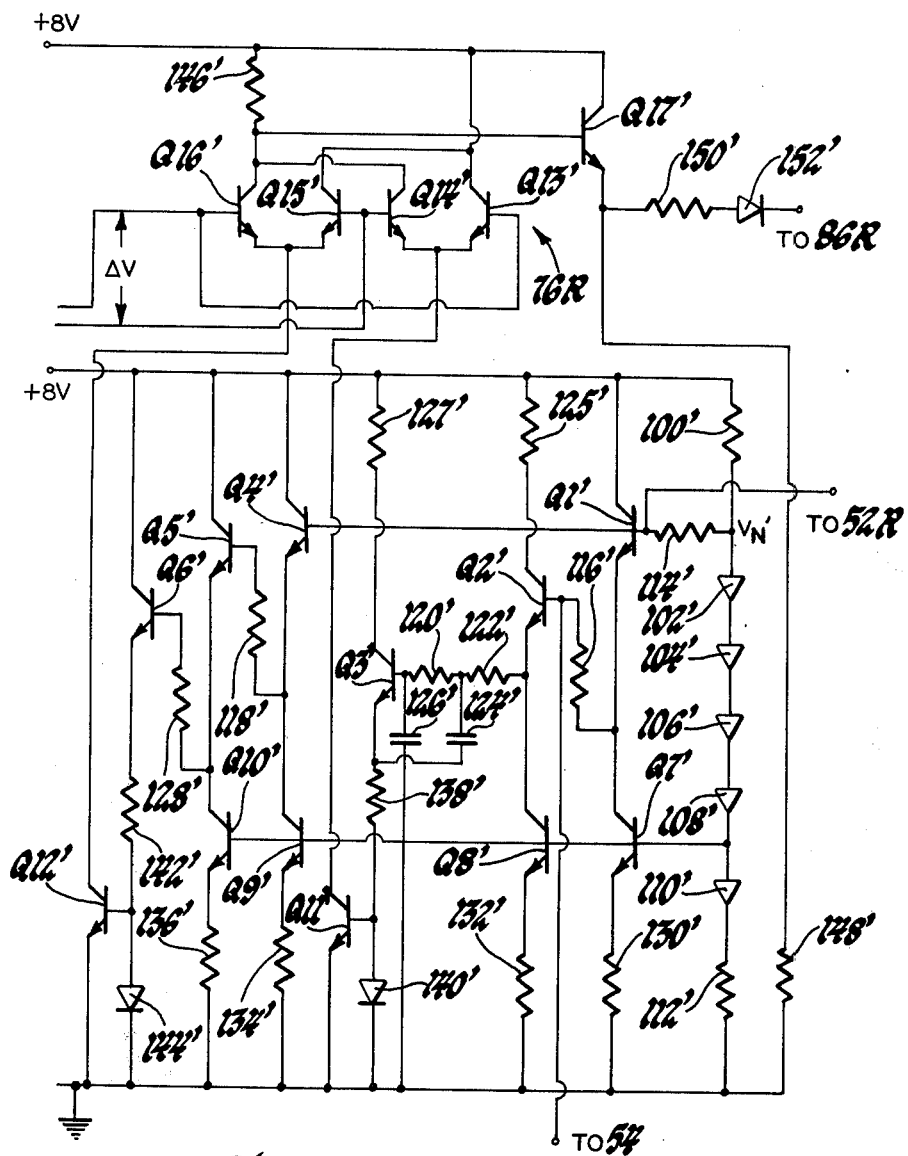

The voltage divider resistors 82 and 84 preferably establish a control voltage $V_c$ equal to $V_{REF}$ when the RF carrier strength is at a level where 50% blend is desirable. The rate that $\Delta V$ changes with respect to changes in the voltage difference between the bases of Q25 and Q26 determines how much blend current reaches the output resistor 146 at each level of $V_c$. The circuit in FIGS. 3a and 3b is preferably a single integrated circuit with the exception of the resistors and capacitors in the active filter. Since the gain of the differential amplifier 88 is set by the internal resistors 174, 176, 184, and 186 the ratio of the resistor 174–184 and 176–186 is such as to produce a large amplifier gain which can then be reduced by cross-coupling a percentage of the collector current of Q23 to resistor 184 and a percentage of the collector current of Q22 to resistor 186 by means of the current steering multiplier 90 under control of the differential amplifier 92. In this manner the differential gain of the amplifier 88 can be reduced and controlled so that a particular RF carrier level of, for example, 5 microvolts will produce a differential voltage $\Delta V$ such as to cause full blend and a RF carrier level of, for example, 30 microvolts will produce a $\Delta V$ sufficient to cause full stereo. The gain adjustment of the differential amplifier 88 is accomplished by the external resistor 214.

The circuitry for processing the right audio signal at the output 32 of the decoder 28 is shown in FIG. 3b and is identical with the circuitry for processing the left audio signal and in the interest of brevity will not be described in detail. Corresponding elements are designated by prime numbers.

Having thus described our invention what we claim is:

1. An audio processor for processing left and right stereophonically related input signals, said processor including left and right signal processing channels, each of said signal processing channels including first and second subchannels, means coupling said left audio input signal to said first and second subchannels of said left signal processing channel and means coupling said right audio input signal to said first and second subchannels of said right signal processing channel, means coupling the first subchannel of said left processing channel with the first subchannel of said right processing channel for producing a blended signal in each of said first subchannels, said second subchannel of said left and right processing channels maintaining the original separation between said left and right audio signals and passing said left and right input signal substantially unaltered, means providing a control voltage related to a characteristic of the carrier signal from which said input signals are obtained, and means responsive to said control voltage for summing a portion of the signal at the output of each of said first subchannels with a complementary portion of the signal at the output of its associated second subchannel to produce a composite left and a composite right audio signal.

2. A radio frequency receiver including means providing left and right stereophonically related audio signals, means providing a DC voltage indicative of the strength of a received carrier signal, an audio processor including left and right signal processing channels responsive to said left and right audio signals respectively, each of said signal processing channels including first and second subchannels which are electrically isolated one from the other, means including a capacitor coupling the first subchannel of said left processing channel with the first subchannel of said right processing channel for producing in each of said first subchannels a frequency dependent blended signal, said second subchannel of said left and right processing channel passing said left and right audio signal substantially unaltered, and means responsive to said DC voltage for summing a portion of the signal at the output of each of said first subchannels with a portion of the signal at the output of each of said second subchannels to produce a composite left and a composite right audio signal.

3. A radio frequency receiver including means providing left and right stereophonically related audio signals, means providing a DC voltage indicative of the strength of a received carrier signal, an audio processor including left and right signal processing channels responsive to said left and right audio signals respectively, each of said signal processing channels including first and second subchannels which are electrically isolated one from the other, means including a capacitor coupling the first subchannel of said left processing channel with the first subchannel of said right processing channel for producing in each of said first subchannels a frequency dependent blended signal, means for attenuating the blended signal in each of said first subchannels as a function of frequency above a predetermined break frequency, said second subchannel of said left and right processing channel passing said left and right audio signal substantially unaltered, and means responsive to said DC voltage for summing a portion of the signal at the output of each of said first subchannels with a portion of the signal at the output of each of said second subchannels to produce a composite left and a composite right audio signal.

4. A radio frequency receiver including means providing pure left and right stereophonically related audio signals, means providing a DC voltage indicative of the strength of a received carrier signal, an audio processor including means for reducing the separation between said left and right audio signals as a function of signal frequency to provide processed left and processed right audio signals, and means responsive to said DC signal for combining complementary portions of said pure left signal and said processed left signal and for combining complementary portions of said pure right signal and said processed right signals to produce a composite left audio signal and a composite right audio signal.

5. In an FM stereo radio receiver which develops pure L and R stereophonic signals and which develops a control signal indicative of the strength of a received carrier signal, the combination comprising:
means including active and inactive L channels through which the L input signal is passed to obtain processed and unprocessed L signals respectively, and including active and inactive R channels in which the R input signal is passed to obtain processed and unprocessed R signals respectively, where the signal transfer characteristics of the active and inactive L channel and of the active and inactive R channel are identical except as hereinafter indicated, means including a capacitor connected between the active L channel and the active R channel for cross-coupling the signals in the active L channel and the active R channel as a function of signal frequency, means including a resistor/capacitor filter stage connected in each of the active L channel and the active R channel for attenuating the signal in the active L and active R channels as a function of signal frequency above a predetermined breakpoint frequency, and means for combining complementary portions of the processed and unprocessed L signals and of the processed and unprocessed R signals to form composite L and R output signals respectively where the portion of processed L signals and the portion of processed R signals increases as the strength of the carrier signal decreases.

6. An FM receiver comprising means providing left and right audio signals, means providing a DC voltage indicative of the strength of a received carrier signal, left and right audio amplifier means, an audio processor including left and right signal processing channels, each of said channels including first and second subchannels, means coupling the left and right audio signals to said first and second subchannels of said left and right channels respectively, each of said first subchannels including first and second unity gain voltage followers, an active filter, and a voltage-to-current converter, a capacitor interconnecting said first subchannels at a junction between said first and second voltage followers, each of said second subchannels including first, second, and third unity gain voltage followers and a voltage-to-current converter, first and second current steering multipliers, means connecting the outputs of the voltage-to-current converters of said left channel to first and second inputs respectively, of said first current multiplier, means connecting the outputs of the voltage-to-current converter of said right channel to first and second inputs respectively of said second multiplier, voltage translator means responsive to said DC voltage for producing a voltage differential related to the difference between said DC voltage and a reference voltage and for applying said differential voltage to said current multipliers to steer complementary portions of the input currents to said first multiplier and produce a first composite current signal at the output of said first multiplier and for steering complementary portions of the input currents to said second multiplier to produce a second composite current signal at the output of said second multiplier, means for converting said first and second composite current signals to first and second composite voltage signals, respective unity gain voltage followers responsive to said first and second composite voltage signals, means for coupling the output of said unity gain voltage followers to said left and right audio amplifiers, respectively.

* * * * *